Patented Jan. 19, 1954

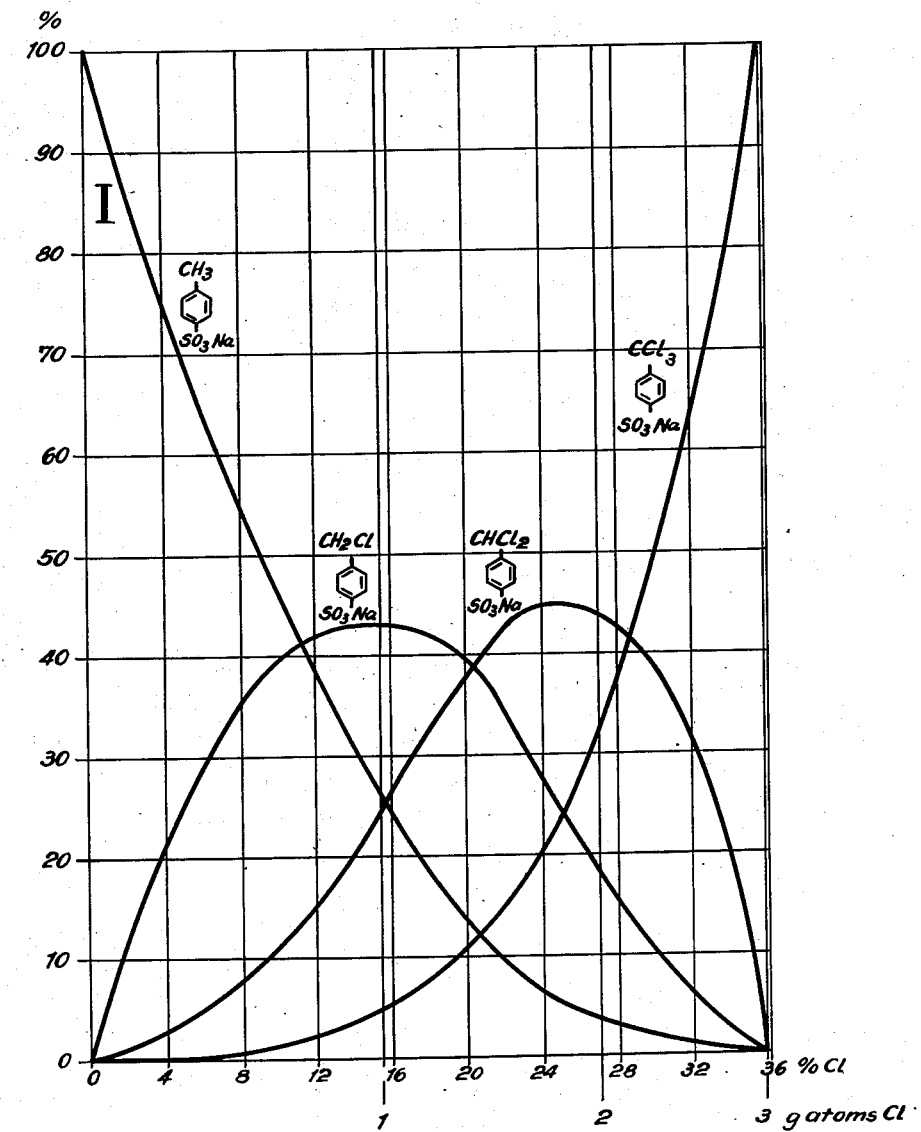

2,666,785

UNITED STATES PATENT OFFICE 2,666,785

PRODUCTION OF SULFOBENZOIC ACID AND ITS SALTS

Hans Feichtinger, Duisburg-Beeck, and Helmut Kolling and Siegfried Puschhof, Duisburg-Hamborn, Germany, assignors to Ruhrchemie Aktiengesellschaft, Oberhausen-Holten, Germany, a German corporation Application June 3, 1952, Serial No. 291,468

Claims priority, application Germany June 9, 1951

4 Claims. (Cl. 260—507)

This invention relates to improvements in the production of substituted carboxylic acids.

According to the well-known Willgerodt reaction, organic compounds having monovalent or bivalent substituents such as, for example, mercaptans, halides, alcohols, ketones or thioketones may be converted into carboxylic amides and carboxylic acids by treatment with ammonium polysulfide solution or with ammonia solution and sulfur. The reaction is effected at elevated temperatures and pressures, and the conditions therefor are well known, i. e. M. Carmack and M. A. Spielman "The Willgerodt Reaction," Adams Organic Reactions, vol. III, p. 83–107.

The substituents of the organic compounds used for the reaction must be positioned in or at the end of an aliphatic chain. It is thus possible by the Willgerodt reaction, for example, to convert aliphatic halides having a centrally or terminally positioned halogen group into carboxylic amides which correspond in structure to the starting compound. Primary halides are known to give better yields than secondary halides, and the latter are known to give better yields than tertiary halides. If the length of the carbon chain of compounds of this type used for the Willgerodt reaction may vary within wide limits. With an increasing carbon number, it is of advantage, especially with higher halides, if the halogen atom is a terminal one. Mono-chlorinated n-heptane having the chlorine statistically distributed throughout the whole chain, will, for example, be converted into n-heptane-amide with a yield of 25–30% of the theoretical yield.

It is known that the yields of the Willgerodt reaction may be increased by effecting the same in the presence of organic solvents, such as, for example, alcohols, pyridine or hydrocarbons. The advantages obtained by the use of the solvents are apparently due to the fact that with the use thereof the reaction may proceed in a homogeneous phase.

The Willgerodt reaction yields obtainable with the addition of a solvent vary within relatively wide limits, depending upon the nature of the solvent. Yields which will approximate the theoretical yields may only be obtained in a very few cases, as, for example, with primary mercaptans. 1-chloro-hexadecane mixed with pyridine as the solvent in optimum proportions will give a 60–70% theoretical yield of palmitic amide. When using dioxane as the solvent, only 22% of the theoretical yield of palmitic amide is obtained at the same conversion rate. With the use of pyridine as the solvent, benzyl chloride may be converted in accordance with the Willgerodt reaction into 75% of the theoretical yield of benzamide and 17% of the theoretical yield of benzoic acid. Without the addition of pyridine, the yields are considerably lower.

In commercial operation of the Willgerodt reaction, the use of organic solvents is undesirable and disadvantageous. The use of these solvents will cause difficulty in the separation and isolation of the reaction products and in the separation and purification of the solvent added. When using water-soluble solvents, the same may even adsorb water from the reaction mixture during the reaction. This water must be removed, and its removal is difficult.

One object of this invention is a process for effecting the Willgerodt reaction without the above-mentioned difficulties.

A further object of this invention is increasing the yield obtained from the Willgerodt reaction. These, and still further objects will become apparent from the following description, read in conjunction with the attached graph:

In accordance with the invention, the starting products for the Willgerodt reaction are organic compounds which have in addition to the monovalent or bivalent substituents a water-solubility effecting group connected to the aliphatic chain. These starting products are reacted in aqueous solution with ammonium polysulfide or ammonia and sulfur at elevated pressure and elevated temperature.

It has been found preferable to use as a water-solubility-effecting group a sulfonic acid group which has been neutralized with sodium, potassium or ammonium hydroxide. Thus, for example, neutralized alkyl aromatics which are sulfonated in the nucleus and which are chlorinated or substituted by another halogen in their side chain, may be reacted in accordance with the invention; sulfonated carboxylic acids or ammonium salts thereof are obtained as the final product.

It has very surprisingly and advantageously been found that by effecting the Willgerodt reaction in accordance with the invention, the same final product may be obtained from chlorinated starting compounds which contain mono-, di- and polychlorides, irrespective of the quantitative proportion in which the different chlorination stages are present. The invention therefore allows for the first time the production, in a simple manner and by the Willgerodt reaction, of homogeneous final products from commercial chlorination products. Prior to the instant invention, the processing of these commercial chlorination products was very difficult, due to the large number of chlorination stages contained therein. Thus, for example, in accordance with the invention, a homogeneous ammonium salt of p-sodium sulfonate benzoic acid may be recovered with high yield from p-sodium sulfonate toluene which is chlorinated in the usual manner.

According to the well-known method of the production of this compound, gaseous chlorine is allowed to act, for example, on pulverulent p-sodium sulfonate toluene. The chlorine will distribute statistically on the methyl group standing in the side chain in the manner calculated by Martin and Fuchs (Zeitschrift fuer Elktrochemie, vol. 27, p. 150 (1921)) for a three-stage gaseous phase reaction in the production of methyl chloride. In addition to the p-sodium sulfonate benzyl chloride, p-sodium sulfonate benzal chloride, and p-sodium sulfonate benzotrichloride are simultaneously formed. A portion of the p-sodium sulfonate toluene will not react. The distribution of the chlorine which will occur during the reaction may be seen from the graph shown in the drawing. In the graph the curves show the quantity of chlorine present in the side chain plotted against the respective composition of the chlorination mixture. The percents, as given in the graph, are percents by weight.

As can be seen when producing chlorinated p-sodium sulfonate toluene which contains in its side chain one gram atom of chlorine for each mol, a homogeneous p-sodium sulfonate benzyl chloride is not obtained. The reaction mixture produced contains the following compounds:

43% by weight of p-sodium sulfonate benzyl chloride
24% by weight of p-sodium sulfonate benzal chloride
5% by weight of p-sodium-sulfonate benzo-trichloride By effecting the known Willgerodt reaction in accordance with the invention, this non-homogeneous mixture containing the different chlorination stages is very surprisingly converted into the homogeneous ammonium salt of p-sodium sulfonate benzoic acid. This conversion is illustrated below:

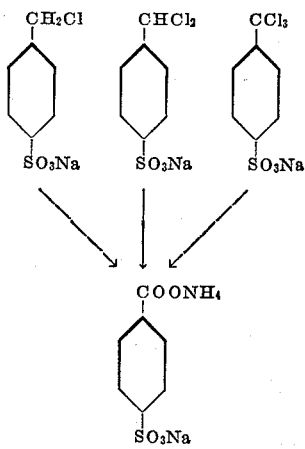

The quantity of p-sodium sulfonate benzotrichloride, which, as compared to the other two compounds, is present to a relatively minor extent in the chlorination mixture, is converted during the reaction by a simple saponification into the ammonium salt of p-sodium sulfonate benzoic acid.

The non-substituted portion which remains after the chlorination of the p-sodium sulfonate toluene as shown in the graph, will not undergo oxidation in the Willgerodt reaction. Thus, in the processing of chlorination products having a certain chlorine content, the portion which will not be reacted and converted may be read from curve I, and the maximum yield which may be obtained can be calculated from this by subtracting it from 100%. In this way, with the quantitative conversion obtained in the reaction, the quantity of the oxidation product may be directly determined from the degree of chlorination. This is, of course, of great technical advantage for the economical utilization of the process. It can thus be seen from curve I of the graph that only a 74% yield of ammonium salt of p-sodium sulfonate benzoic acid are obtained by the addition of 1 gram atom of chlorine in the side chain, while an 84–90% yield of the ammonium salt of p-sodium sulfonate benzoic acid will be obtained by the addition of 1.3 to 1.5 gram atoms of chlorine for each mol of starting material. It therefore follows that 1.3 to 1.5 gram atoms of chlorine for each mole of starting material are preferable amounts.

Similar conditions as those set forth above have been observed in the chlorination and the subsequent Willgerodt reaction of o-sodium sulfonate toluene and p-sodium sulfonate ethyl benzene. Similar conversions are also obtained even with longer side chains. In all cases, the nuclear sulfonic acid group causes the reaction to be effected in a homogeneous phase, since it assures water-solubility of the starting material. This eliminates the necessity for use of an additional solvent which was conventionally required to obtain good results in the Willgerodt reaction prior to the instant invention.

As contrasted to the conventional manner of effecting the Willgerodt reaction in which the amide and small quantities of the ammonium salt of carboxylic acid were always formed in the oxidation product, the method of effecting the Willgerodt reaction in accordance with the invention, using as starting products compounds which are chlorinated in the side chain and sulfonated in the nucleus, results in homogeneous final products, irrespective of the quantity of chlorine introduced in the side chain.

The conversion of aromatic alkyl chloride compounds in accordance with the invention is effected in the conventional manner with aqueous ammonium polysulfide solutions or with ammonia solutions and elemental sulfur. The yields which are obtainable are largely dependent in the composition of the reaction solution which contains in general per liter approximately 5–20 moles ammonia, 0.1–5 moles hydrogen chloride and 1–10 gram atoms of sulfur. However, also other compositions of the reaction solution, the quantitative proportions of which are higher or lower than mentioned above, are suitable for effecting the process according to the invention.

Also the proportion of the ammonium polysulfide solution to the starting material charged may be varied within wide limits. In general, it is of advantage to use 2–20 parts and preferably 4–8 parts of ammonium polysulfide solution for each part of starting material.

The reaction is most advantageously effected in closed reaction containers which consist of or are lined with stainless steel, glass, porcelain or other materials which are difficultly attacked.

The pressure developing during the reaction by external heating is dependent on the vapor pressure of the reaction product and amounts to approximately 5–40 kg. per sq. cm. Considerably higher reaction pressures may also occur if, for example, gaseous ammonia is pressed into the reaction vessel. After the reaction is completed, the gas pressure decreases as soon as the reaction mixture is cooled to room temperature. Therefore, it is not necessary in many cases to balance the pressure with the atmospheric pressure before opening the reaction container.

The temperatures required for the reaction are generally between 100 and 300° C. and preferably between 150 and 180° C. The reaction time is dependent on the particular working conditions and may be as long as 20 hours.

The sulfo-carboxylic acids and sulfo-carboxylic salts produced in accordance with the invention, are valuable starting materials for numerous organic synthesis processes.

The following examples are given by way of illustration and not limitation:

Example 1

Completely dry p-sodium sulfonate toluene ground as fine as dust was placed in a three-necked flask of 500 cc. capacity, which was irradiated by two Philips heating lamps, and treated with chlorine at a temperature of 80–85° C. until an increase in weight of 1.41 gram atoms of chlorine per mol of salt had occurred. During the chlorination, the salt was stirred so intensively that it was in a constant rolling and suspended state.

91.4 grams of the chlorinated sodium salt, 128 grams of sulfur and 600 cc. of ammonia water (density=0.895) were heated for six hours at 180° C. in a steel-autoclave, while maintaining the temperature fluctuations within ±5° C. After completion of the reaction, the content of the autoclave was evaporated to dryness. The dry reaction product was dissolved in water and treated with active carbon. After filtration and repeated evaporation, 78.5 grams of ammonium salt of p-sodium sulfonate benzoic acid were obtained.

Example 2

100 grams of o-sodium sulfonate toluene chlorinated in the side chain and having a content of 12% by weight of chlorine were reacted by the Willgerodt reaction in the manner described in Example 1 and worked up. 66 grams of ammonium salt of o-sodium sulfonate benzoic acid were obtained as the final product.

Example 3

50 grams of chlorinated p-potassium sulfonate toluene containing 14.1% of chlorine were reacted in the manner described in Example 1 with an aqueous ammonia solution containing elemental sulfur. The resulting reaction product was worked up in the manner described in Example 1. 38 grams of ammonium salt of p-potassium sulfonate benzoic acid were obtained as the final product.

Example 4

73 grams of chlorinated p-calcium sulfonate toluene containing 15.0% of chlorine were reacted by the Willgerodt reaction in the manner described in Example 1 and worked up. 54 grams of ammonium salt of p-calcium sulfonate benzoic acid were obtained as the final product.

We claim:

1. Process for the preparation of substituted carboxylic acid compounds which comprises contacting at an elevated temperature and pressure a mixture of p-sodium sulfonate benzyl chloride, p-sodium sulfonate benzal chloride and p-sodium sulfonate benzotrichloride with a member selected from the group consisting of aqueous ammonium polysulfide solution and ammonia solution with sulfur and recovering a substituted carboxylic acid compound.

2. Process according to claim 1 in which said substituted carboxylic acid compound is the ammonium salt of p-sodium sulfonate benzoic acid.

3. Process according to claim 2 which comprises hydrolyzing said ammonium salt and recovering p-sodium sulfonate benzoic acid.

4. Process according to claim 1 in which said mixture is obtained by side linkage chlorination of p-sodium sulfonate toluene.

HANS FEICHTINGER.
HELMUT KOLLING.
SIEGFRIED PUSCHHOF.

No references cited.